United States Patent
McGuffin et al.

(10) Patent No.: US 7,835,316 B2
(45) Date of Patent: Nov. 16, 2010

(54) METHOD FOR MOBILE NETWORK OPERATIONAL STATE INDICATION

(75) Inventors: Thomas F. McGuffin, Bellevue, WA (US); Tom D. Judd, Woodinville, WA (US); Bryan L. Rowe, Phoenix, AZ (US); Reetu Gupta, Redmond, WA (US)

(73) Assignee: Honeywell International Inc., Morristown, NJ (US)

(*) Notice: Subject to any disclaimer, the term of this patent is extended or adjusted under 35 U.S.C. 154(b) by 277 days.

(21) Appl. No.: 12/172,865

(22) Filed: Jul. 14, 2008

(65) Prior Publication Data

US 2009/0245116 A1    Oct. 1, 2009

Related U.S. Application Data (60) Provisional application No. 61/039,690, filed on Mar. 26, 2008.

(51) Int. Cl.
*H04B 7/185* (2006.01)
(52) U.S. Cl. .................. 370/316; 370/252; 370/248; 370/328
(58) Field of Classification Search .................. None
See application file for complete search history.

(56) References Cited

U.S. PATENT DOCUMENTS

| | | | |
|---|---|---|---|
| 5,111,400 A | 5/1992 | Yoder | |
| 5,798,726 A | 8/1998 | Schuchman et al. | |
| 5,883,586 A | 3/1999 | Tran et al. | |
| 5,937,349 A * | 8/1999 | Andresen | ............ 455/431 |
| 6,160,497 A | 12/2000 | Clark | |
| 6,181,260 B1 | 1/2001 | Simon et al. | |
| 6,353,779 B1 | 3/2002 | Simon et al. | |
| 6,677,888 B2 | 1/2004 | Roy | |
| 6,720,890 B1 | 4/2004 | Ezroni et al. | |
| 6,965,771 B2 | 11/2005 | Rossi | |
| 7,020,708 B2 | 3/2006 | Nelson et al. | |
| 7,099,665 B2 * | 8/2006 | Taylor | ............ 455/430 |
| 7,158,877 B2 | 1/2007 | Carlsson et al. | |
| 7,184,763 B2 | 2/2007 | Roy et al. | |
| 7,328,011 B2 | 2/2008 | Fagan et al. | |
| 7,346,036 B2 | 3/2008 | Fagan et al. | |

OTHER PUBLICATIONS

European Patent Office, "European Search Report", Jul. 6, 2009, Published in: EP.
"McMurdo F1 DSC Marine VHF Radio with DSC Operation Manual", 2002, Publisher: McMurdo Ltd.

* cited by examiner

*Primary Examiner*—Bob A Phunkulh
(74) *Attorney, Agent, or Firm*—Fogg & Powers LLC (57) ABSTRACT

A method to indicate a transitional operational state of a communication link is provided. The method includes indicating the operational state of the communication link is operable, transmitting data between a communication management unit and an endpoint via the communication link, and determining if the transmitted data is received at the endpoint. The method also comprises continuing to indicate the operational state of the communication link is operable when the transmitted data is received at the endpoint and determining if a transport layer has timed out when the transmitted data is not received at the endpoint within a pre-selected time. The method also comprises indicating the operational state of the communication link is transitional when the transport layer has not timed out and the transmitted data is not received at the endpoint within the pre-selected time.

20 Claims, 4 Drawing Sheets

METHOD FOR MOBILE NETWORK OPERATIONAL STATE INDICATION

This application claims the benefit of U.S. Provisional Application No. 61/039,690, filed on Mar. 26, 2008 which is incorporated herein by reference in its entirety.

BACKGROUND

Pilots and air traffic controllers use the Aeronautical Telecommunication Network (ATN) to exchange datalink messages. It is important for the pilots and controllers to be aware of the operational state of a communication link in a network so they can choose to use an alternate method of communication as needed. Typically, the alternative method of communication is a voice communication. For example, it is important for the pilot to know if a response message sent to the air traffic controller was not received by the air traffic controller due to a change in the operational state of a communication link in the network. Likewise, it is important for the air traffic controller to know if a message sent to the pilot was not received by the pilot due to a change in the operational state of a communication link in the network. The operational state of a communication link in a network can change as the aircraft moves and the coverage patterns for the signal, reflections of the signal and range between the aircraft and the communication network change. Currently, avionics display screens only indicate if the communication management unit (CMU) is communicatively coupled to the ATN with a "CONNECTED" or "DISCONNECTED" message. Likewise, air traffic controller workstation screens only indicate if communication with the communication management unit (CMU) in the aircraft is communicatively coupled to the ATN with a "CONNECTED" or "DISCONNECTED" message.

There is a third transitional operational state between connected and disconnected during which messages cannot be delivered and during which communication can easily be restored. This third state is currently identified as "CONNECTED" or "DISCONNECTED." This third transitional operational state can last for as long as five minutes, during which time the pilot or air traffic controller may be under the impression that his message is being considered, while in fact, the message may be un-received during the whole transitional time.

SUMMARY

The present application relates to a method to indicate a transitional operational state of a communication link. The method includes indicating the operational state of the communication link is operable, transmitting data between a communication management unit and an endpoint via the communication link, and determining if the transmitted data is received at the endpoint. The method also comprises continuing to indicate the operational state of the communication link is operable when the transmitted data is received at the endpoint. When the transmitted data is not received at the endpoint within a pre-selected time, the method comprises determining if a transport layer has timed out. When the transport layer has not timed out and the transmitted data is not received at the endpoint within a pre-selected time, the operational state of the communication link is indicated as transitional.

DRAWINGS

In accordance with common practice, the various described features are not drawn to scale but are drawn to emphasize features relevant to the present invention. Like reference characters denote like elements throughout figures and text.

DETAILED DESCRIPTION

In the following detailed description, reference is made to the accompanying drawings that form a part hereof, and in which is shown by way of illustration specific illustrative embodiments in which the invention may be practiced. These embodiments are described in sufficient detail to enable those skilled in the art to practice the invention, and it is to be understood that other embodiments may be utilized and that logical, mechanical and electrical changes may be made without departing from the scope of the present invention. The following detailed description is, therefore, not to be taken in a limiting sense.

The present invention provides a method to provide information indicative of at least three operational states of a communication link between a communication management unit and an endpoint of a data network. The information indicative of the at least three operational states of a communication link is displayed on a screen (or portion of a screen) in the visual status indicator. In one implementation of this embodiment, the information indicative of the at least three operational states of a communication link is annunciated by an audio system communicatively coupled to the communication management unit. In another implementation of this embodiment, the communication management unit is a communication management unit in an aircraft. In one such implementation, the communication management unit is operating in an Aeronautical Telecommunication Network (ATN). In this case, the endpoints are one or more workstations used by air traffic controllers.

Figure 1:
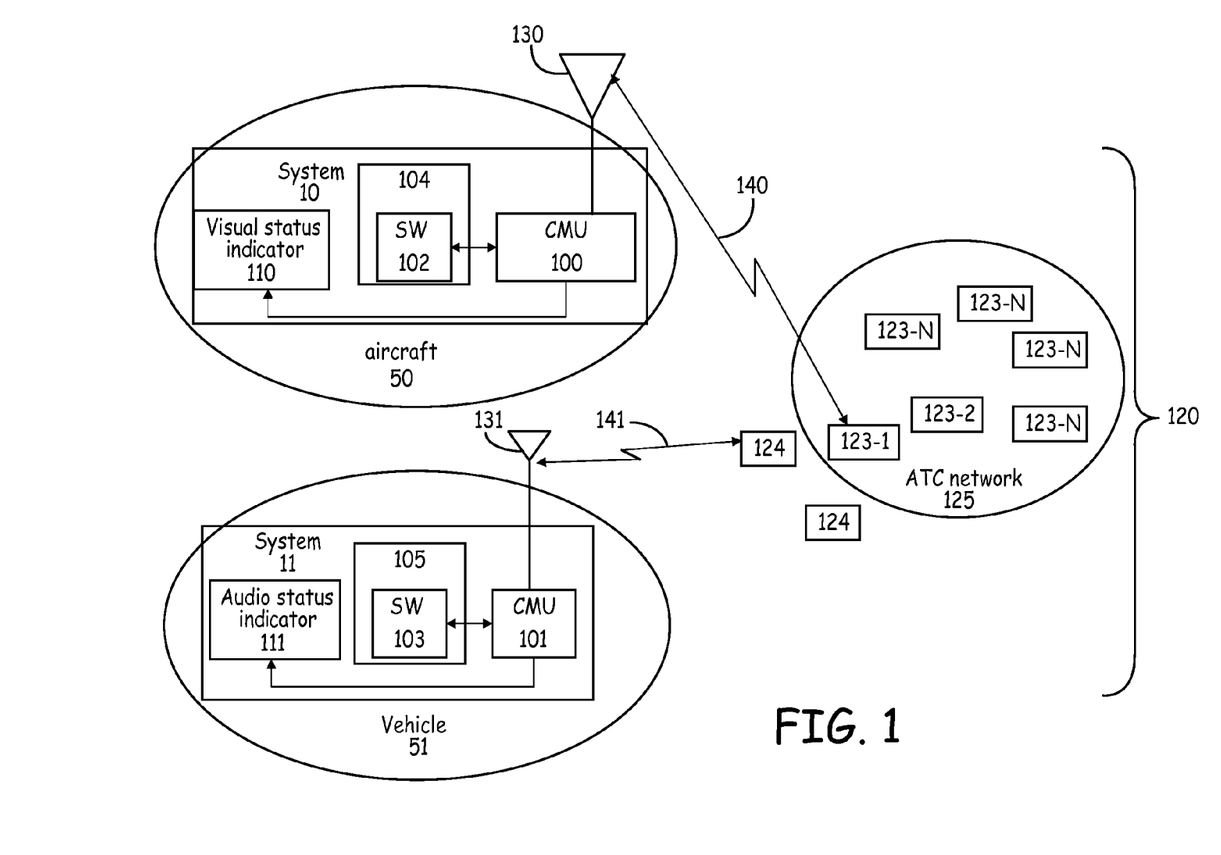
FIG. 1 is a block diagram of a system for a data network communicatively coupled to a data network in accordance with the present invention.

FIG. 1 shows a block diagram of a system 10 communicatively coupled to a data network 120 in accordance with the present invention. The system 10 includes a communication management unit 100 and a status indicator, which is a visual status indicator 110. The system 10 is configured to indicate a transitional operational state of a communication link 140 in the data network 120. FIG. 1 also shows a block diagram of a system 11 communicatively coupled to a data network data network 120 in accordance with the present invention. The system 11 includes a communication management unit 101 and a status indicator, which is an audio status indicator 111. The system 11 is configured to indicate a transitional operational state of a communication link 141 in the data network 120. The communication management units 100 and 101 are operable to communicate with a plurality of endpoints 123-1, 123-2, 123-N and/or 124 in the data network 120. The endpoints 123-1, 123-2, 123-N and/or 124 are configured to receive data from the at least one communication management unit 100 and/or 101.

As shown in FIG. 1, the data network 120 includes the system 10 in an aircraft 50, the system 11 in a vehicle 51, and at least one air traffic controller (ATC) network 125, which includes at least one endpoint 123. For example, the air traffic controller network 125 can include endpoints 123-1, 123-2, and a plurality of endpoints 123-N. The endpoints 123-1, 123-2, and 123-N are routers or workstations. The data network 120 also includes routers and workstations (shown as endpoints 124) that are outside of the air traffic controller network 125. The endpoints 123-1, 123-2, 123-N, and 124 are also referred to herein as "peers 123" or "peers 124."

In an alternate implementation, there is no air traffic controller network 125 in the data network 120. For example, the data network 120 may be a network implemented by a city fire department, in which case the vehicle 51 is a fire engine and the endpoints 124 are workstations or routers used by a dispatcher of the fire engines. In such an implementation there is no aircraft 50 in the data network 120.

The aircraft 50 carries the system 10 and an antenna 130. The communication management unit 100 is communicatively coupled to the visual status indicator 110 and the antenna 130. The communication link 140 is established (or desired to be established) between the communication management unit 100 in the aircraft 50 and one of the endpoints, such as endpoint 123-1, in the air traffic controller network 125 of the data network 120. When data is transmitted from the communication management unit 100 via antenna 130, signals are also sent to the visual status indicator 110 to indicate the current operational state of the communication link 140. As defined herein, the current operational state of the communication link 140 is the operational state of the communication link at a present moment in time.

Software 102 is stored in storage medium 104 and is executable by one or more processors in the communication management unit 100. The communication management unit 100 uses the output generated by the software 102 to control the visual status indicator 110. The communication management unit 100 sends the current operational state of the communication link 140 to the visual status indicator 110.

The current operational state of the communication link is displayed on the visual status indicator 110. In this manner, the visual status indicator 110 is a user interface for the pilot or controller of the aircraft 50 to display one of the three operational states of the communication link 140. The visual status indicator 110 is also referred to herein as a "status indicator 110."

The vehicle 51 carries system 11 and an antenna 131. The communication management unit 101 is communicatively coupled to the audio status indicator 111 and the antenna 131. As shown in FIG. 1, the communication link 141 is established (or desired to be established) between the communication management unit 101 in the vehicle 51 and one of the endpoints 124 in the data network 120. When data is transmitted from the communication management unit 101, signals are also sent to the audio status indicator 111 to indicate the operational state of the communication link 141.

Software 103 is stored in storage medium 105 and is executable by one or more processors in the communication management unit 101. The communication management unit 101 uses the output generated by the software 103 to control the audio status indicator 111. The communication management unit 101 sends the current operational state of the communication link 141 to the audio status indicator 111.

The current operational state of the communication link 141 is announced through the audio status indicator 111. In one implementation of this embodiment, the audio status indicator 111 includes software to translate signals into waveforms that are used to generate sound waves that are emitted from speakers. In this manner, the audio status indicator 111 is a user interface for the controller of the vehicle 51 to listen to an announcement of one of the at least three operational states of the communication link 141. The audio status indicator 111 is also referred to herein as a "status indicator 111."

In one implementation of this embodiment, the audio status indicator 111 is configured to announce the current operational state of the communication link 141 when the operational state transitions from one state to another state (also referred to herein as a previous operational state to the current operational state, respectively). As defined herein, the previous operational state of the communication link 141 (or 140) is the operational state of the communication link 141 (or 140) at a previous moment in time. In another implementation of this embodiment, the audio status indicator 111 is configured to periodically announce the current operational state of the communication link 141. In yet another implementation of this embodiment, the audio status indicator 111 is configured to announce the current operational state of the communication link 141 when the operational state transitions from one state to another state and also to periodically announce the current operational state of the communication link 141 in between the transition times.

In one implementation of this embodiment, the vehicle 51 is an aircraft. In another implementation of this embodiment, the vehicle 51 is a ground based vehicle or a water based vehicle. In yet another implementation of this embodiment, the audio status indicator 111 in the vehicle 51 is replaced by the visual status indicator 110. In yet another implementation of this embodiment, the visual status indicator 110 in the aircraft 50 is replaced by the audio status indicator 111. In yet another implementation of this embodiment, the vehicle 51 and/or aircraft 50 include both an audio status indicator 111 and a visual status indicator 110.

There are at least three possible operational states of the communication links 140 and 141: "OPERABLE," "INOPERABLE," and "TRANSITIONAL." The TRANSITIONAL state is the transitional state between "OPERABLE" and "INOPERABLE." When the transitional state is indicated, the communication link 140 is established but a handshake is not yet completed between the communication management unit 100 and a peer 123 in the data network 120. During the transitional state, the communication on the communication link is on hold while the communication management unit 100 attempts to complete the handshake with one of the peers 123. The transitional state is also referred to herein as "HOLD." If the handshake takes longer than a pre-selected time to establish with one peer 123, the communication management unit 100 tries again or tries to complete a handshake with another peer 123. If the transport layer times out before the handshake is completed, the communication link is torn down and the operational state of the communication link transitions from "HOLD" to "INOPERABLE," as is described below with reference to FIG. 2. In one implementation of this embodiment, the transitional state is broken into two transitional portions, so that there are four operational states of the communication links 140 and 141. For example, a first portion of the transitional state can be indicated to the user as "HOLD INITIATED" and a second portion of the transitional state can be indicated to the user as "HOLD ONGOING." In one such case, the transitional state can be indicated to the user as "HOLD INITIATED" for a second pre-selected duration after the start of the transitional state.

In one implementation of this embodiment, the communication link 140 is a wireless communication link as shown in FIG. 1. In another implementation of this embodiment, the communication link 140 is a wired communication link, such as a wired or optical fiber link. For example, when the aircraft 50 is at an airport terminal, the communication management unit 100 can be hard wired to the air traffic controller network 125. In yet another implementation of this embodiment, the communication link 140 includes both a wired communication link and a wireless communication link.

When data is transmitted from the communication management unit 100, signals are sent to the antenna 130 and a communication link 140 is established between the antenna 130 and an endpoint 123 (or endpoint 124) in the data network 120.

Figure 2:
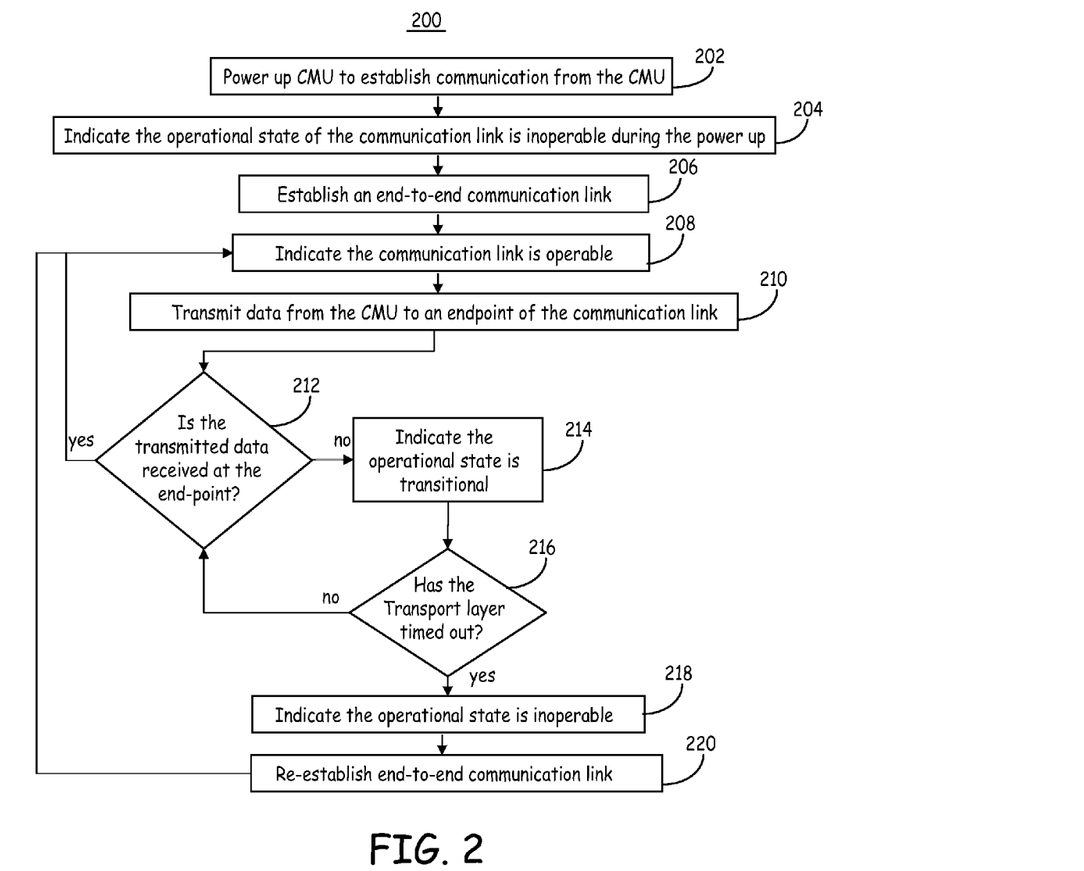
FIG. 2 is a flow diagram of one embodiment of a method to indicate a transitional operational state in accordance with the present invention.

FIG. 2 is a flow diagram of one embodiment of a method 200 to indicate a transitional operational state in accordance with the present invention. The method 200 is described herein with reference to the communication management unit 100 in data network 120, although method 200 is applicable to the communication management unit 101 and to other networks having other configurations. A computer readable medium encoded with computer instructions stored thereon (indicated as software 102 and storage medium 104) are executed by processors in the communication management unit 100.

Figure 3:
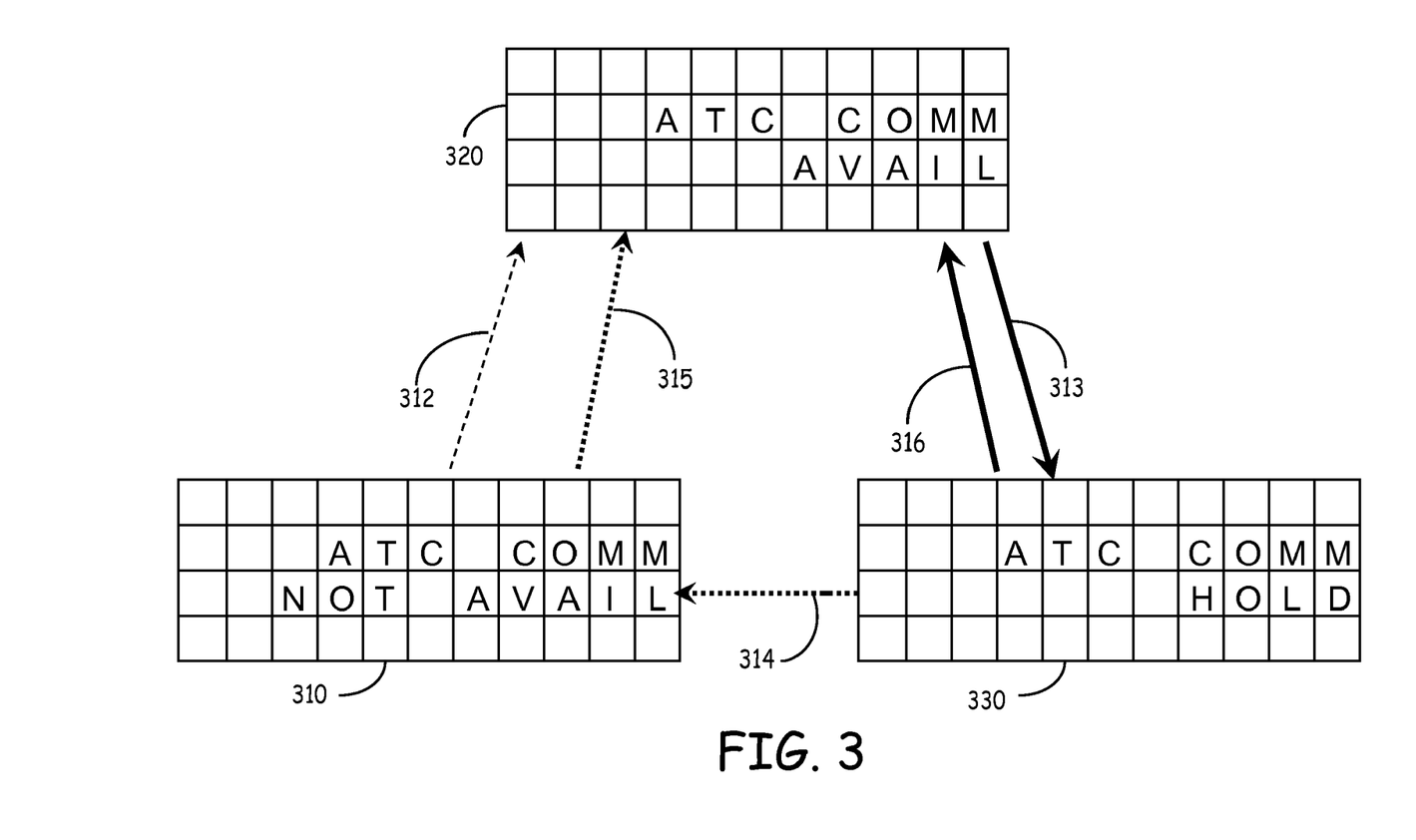
FIG. 3 is a block diagram of three views of at least a portion of a screen in a visual status indicator in accordance with the present invention.

At block 202, the communication management unit 100 is powered up to establish communication from the communication management unit 100 in the aircraft 50. At block 204, the status indicator indicates the operational state of the communication link is inoperable during the power up. FIG. 3 is a block diagram of three views 310, 320, and 330 of at least a portion of a screen in the visual status indicator 110 in accordance with the present invention. The three views 310, 320, and 330 indicate three respective states of a communication link 140.

During the power up of the communication management unit 100 (block 202), the exemplary view 310 of the visual status indicator 110 is displayed to the pilot (block 204). View 310 illustrates an embodiment of the notice that the communication link 140 is not yet established by displaying "NOT AVAIL" on the visual status indicator 110. Other messages can be displayed to indicate the communication link 140 is inoperable. For example, the message "NO CONNECTION" or "INOPERABLE" can be displayed on the visual status indicator 110 to indicate the communication link 140 is inoperable.

At block 206, an end-to-end communication link is established between the communication management unit 100 and an endpoint, such as an endpoint 123-1 in the air traffic controller network 125. In FIG. 3, the establishment of the communication link 140 is indicated as dashed arrow 312 which points toward view 320.

At block 208, the visual status indicator 110 communicates that the operational state of the communication link 140 is operable when the end-to-end communication link 140 between the communication management unit 100 and the endpoint is established and operational. The exemplary view 320 (FIG. 3) illustrates an embodiment of the indication that the communication link 140 is operational by the message "AVAIL." Other messages can be used to indicate the communication link 140 is operational. For example, the messages "AVAILABLE," "CONNECTED," "OPERA-TIONAL," and "LINK ESTABLISHED," can be used to indicate the communication link 140 is established.

At block 210, data is transmitted from the communication management unit 100 to the endpoint 123-1 via the communication link 140. At block 212, the communication management unit 100 determines if the transmitted data is received at the endpoint 123-1 within a pre-selected time (also referred to herein as a first pre-selected time). This determination is made via the data link layer of the communication management unit 100.

Figure 4:
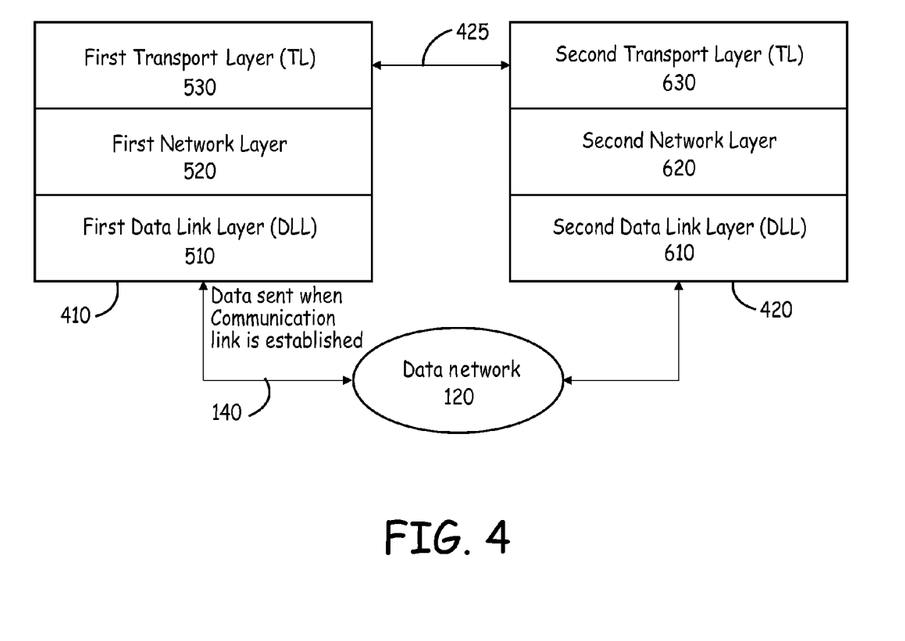
FIG. 4 is a block diagram of at least a portion of stack layers in a communication management unit and in an endpoint, respectively, in accordance with the present invention.

FIG. 4 is a block diagram of a portion of stack layers 410 and 420 in the network architecture of a communication management unit 100 and in an endpoint 123-1, respectively, in accordance with the present invention. The function and structure of each of the layers in the stack layers 410 and 420 is described in the *ICAO DOC 9705-AN/956 Manual for Technical Provisions for the Aeronautical Telecommunication Network* and is known in the art. The endpoint 123-1 is communicatively coupled to the communication management unit 100 via the data network 120. A first network layer 520 is between the first transport layer 530 and the first data link layer 510. A second network layer 620 is between the second transport layer 630 and the second data link layer 610. The communication is initiated by a handshake process between the data link layer 510 (also referred to herein as "first data link layer 510") in the communication management unit 100 and the data link layer 610 (also referred to herein as "second data link layer 610") in the endpoint 123-1.

If the handshake does not occur within the pre-selected time, the communication management unit 100 determines that the endpoint 123-1 is not receiving the data. The communication management unit 100 then tries to send the data again to either the same endpoint 123-1 or to another one of the endpoints, such as endpoint 123-2 (FIG. 1), of the data network 120.

If there is a negative determination at block 212, the flow proceeds to block 214. In FIG. 3, the determination that the endpoint 123-1 is not receiving the data is indicated as solid bold arrow 313, which points from view 320 to view 330. At block 214, the status indicator, such as visual status indicator 110, communicates that the operational state of the communication link 140 is transitional. The operational state of the communication link 140 is transitional when the transport layer has not timed out and the transmitted data is not received at the endpoint 123-1.

As shown in FIG. 3, the exemplary view 330 of the visual status indicator 110 illustrates an embodiment of the indication that the communication link 140 is transitional by the message "HOLD." Other messages can communicate the transitional state of the communication link 140. For example, the messages "ON HOLD," "WAIT FOR COMMUNICATION LINK TO BE ESTABLISHED," or "STANDBY" can be used to indicate the communication link 140 is transitional. In this manner, the pilot knows that the data has yet to be sent over the communication link 140. In one implementation of this embodiment, an audio status indictor announces that the operational state of the communication link 140 is transitional at block 214. The flow proceeds to block 216 from block 214.

At block 216, the communication management unit 100 determines if the transport layer has timed out. The method used for a transport layer to time out is described in the *ICAO DOC 9705-AN/956, Manual for Technical Provisions for the Aeronautical Telecommunication Network* as known in the art. The end-to-end communication is monitored between a first transport layer (TL) 530 (FIG. 4) in the communication management unit 100 and a second transport layer (TL) 630 in one of the endpoints, such as endpoint 123-1 or 123-2. The communication between the first transport layer 530 and the second transport layer 630 is shown as link 425.

The first transport layer 530 in the communication management unit 100 is communicatively coupled to the second transport layer 630 in the endpoint 123-1 via the communication link 425 while a handshake is ongoing with the communicatively coupled endpoint 123-1, referred to herein as the first endpoint 123-1. The first transport layer 530 starts a timer in the software when the attempt to complete the handshake with the first endpoint 123-1 is initiated, i.e., when the communication link 425 is established. If a handshake with the first endpoint 123-1 is not completed between the data link layers 510 and 610, the communication management unit 100 attempts to complete a handshake with another one of the endpoints 123-2, referred to herein as the second endpoint 123-2. In this case, the first transport layer 530 in the communication management unit 100 communicatively couples the first data link layer 510 to the second data link layer 610 of the second endpoint 123-2 via a newly established communication link 140 to attempt a handshake with endpoint 123-2. Likewise, communication management unit 100 communicatively couples the first transport layer 530 to the second transport layer 630 in the second endpoint 123-2 via a newly established communication link 425.

The first transport layer 530 continues to let the timer run when the attempt to complete the handshake with the second endpoint 123-2 is being performed at the data link layers 510 and 610. Thus, once the initial communication link 425 is established between the first transport layer 530 and the second transport layer 630 of the first endpoint 123-1, the transport layer 530 waits for a "transport time" (i.e., a second pre-selected time that is greater than the first pre-selected time). If the transport time does not expire, the data sent from the communication management unit 100 was received at one of the endpoints 123-1, 123-2, or 123 via a communication link 140. In this manner, the transport layer 530 monitors end-to-end communications between a first transport layer 530 in the communication management unit 100 and a second transport layer 630 in at least one endpoint 123-1.

In one implementation of this embodiment, the communication management unit 100 attempts to establish a communication link 140 with any one of the endpoints 123 within the air traffic controller network 125. If the first attempt to reach a first endpoint 123-1 does not result in a completed handshake, the communication management unit 100 attempts to reach a second endpoint 123-2 in the air traffic controller network 125, and so on until a handshake is completed or the until the transport layer 530 of the communication management unit 100 times out. If the communication management unit 100 is unable to establish a communication link 140 with one of the endpoints 123(1-N) within the air traffic controller network 125, the communication management unit 100 will not try to establish a communication link 140 with an endpoint 124 outside of the air traffic controller network 125 and the first transport layer 530 will eventually time out.

If the communication management unit 100 determines at block 216, that the transport layer has timed out, the flow proceeds to block 218. When the transport time expires, the transport layer 530 tears down the communication link 140. In FIG. 3, the determination that the transport time has expired is indicated as dashed bold arrow 314, which points from view 330 to view 310. At block 218, the status indicator, such as visual status indicator 110, communicates that the operational state of the communication link 140 is inoperable. The operational state of the communication link 140 is inoperable when the first transport layer 530 has timed out and the transmitted data is not received at the endpoint 123.

The exemplary view 310 shown in FIG. 3 illustrates an embodiment of the notice that the communication link 140 is not established as described above with reference to block 204. In this manner, the user knows that the communication link 140 that was previously established has been lost and the data is not currently being sent over the communication link 140.

The flow proceeds to block 220 where the communication management unit 100 attempts to re-establish an end-to-end communication link, such as communication link 140. The flow proceeds back to block 208 once the communication link 140 is established again. In this case, the communication link 140 may be established with another one of the endpoints 123. In FIG. 3, the re-establishment of the communication link 140 is indicated as dashed bold arrow 315, which points from view 310 to view 320.

If the communication management unit 100 determines at block 216, that the transport layer has not timed out, the flow proceeds back to block 212. At block 212, if the communication management unit 100 determines that the transmitted data has been received at the endpoint 123 before the first transport layer 530 has timed out, the flow proceeds to block 208. In FIG. 3, the determination that the transmitted data has been received at the endpoint 123 before the first transport layer 530 has timed out is indicated as solid bold arrow 316, which points from view 330 to view 320.

At block 208, the status indicator, such as visual status indicator 110, communicates that the communication link 140 is "OPERABLE." If the flow of method 200 proceeds from block 208 to block 210 to block 212 back to block 208, the status indicator continuously communicates that the communication link 140 is "OPERABLE." If the flow of method 200 proceeds from block 208 to block 210 to block 212 to block 214 to block 216, back to block 212 and then to block 208, the status indicator transitions from communicating that the communication link 140 is "OPERABLE" to "ON HOLD," and back to "OPERABLE."

As shown in view 320, the operational state of the communication link is indicated by the message "AVAIL" as described above with reference to block 208. The flow proceeds to block 210 and data continues to be transmitted from the communication management unit 100 to the communicatively coupled endpoint 123. While the communication link 140 is established and operational, data can be sent between the communication management unit 100 and the endpoint 123. In this manner, the user of the communication management unit 100 and the status indicator 110 knows when the data is on hold. The user then has the option of establishing an alternative method of communicating with a user of the endpoint 123 at another location of the data network 120.

Although specific embodiments have been illustrated and described herein, it will be appreciated by those of ordinary skill in the art that any arrangement, which is calculated to achieve the same purpose, may be substituted for the specific embodiment shown. This application is intended to cover any adaptations or variations of the present invention. Therefore, it is manifestly intended that this invention be limited only by the claims and the equivalents thereof.

What is claimed is:

1. A method to indicate a transitional operational state of a communication link, the method comprising:
   indicating the operational state of the communication link is operable;
   transmitting data from a communication management unit to an endpoint via the communication link;

determining if the transmitted data is received at the endpoint;

continuing to indicate the operational state of the communication link is operable when the transmitted data is received at the endpoint;

determining if a transport layer has timed out when the transmitted data is not received at the endpoint within a pre-selected time; and indicating the operational state of the communication link is transitional when the transport layer has not timed out and the transmitted data is not received at the endpoint within the pre-selected time.

2. The method of claim 1, further comprising:

powering up the communication management unit to establish communication from the communication management unit; and indicating the operational state of the communication link is inoperable during the power up.

3. The method of claim 2, further comprising:

establishing an end-to-end communication link based on the powering up of the communication management unit; and indicating the operational state of the communication link is operable when the end-to-end communication link is established.

4. The method of claim 3, further comprising:

indicating the operational state of the communication link is inoperable when the transport layer has timed out; and re-establishing the end-to-end communication link based on the transport layer timing out.

5. The method of claim 1, further comprising:

monitoring end-to-end communication between a first transport layer in the communication management unit and a second transport layer in at least one endpoint.

6. The method of claim 5, further comprising:

transmitting the data from a first data link layer in the communication management unit to a second data link layer in one of the at least one endpoints via the communication link; and timing out the first transport layer in the communication management unit if the transmitted data is not received at the second data link layer in one of the at least one endpoints before a transport time elapses.

7. The method of claim 1, wherein the indicating of the operational state comprises displaying the operational state on a visual status indicator.

8. The method of claim 1, wherein the indicating of the operational state comprises announcing the operational state via an audio system.

9. A system for a data network configured to indicate a transitional operational state of a communication link, the data network comprising:

at least one communication management unit operable to communicate with a plurality of endpoints in the data network, the endpoints configured to receive data from the at least one communication management unit; and at least one status indicator communicatively coupled to the communication management unit, wherein the communication management unit is configured to control the status indicator, wherein the communication management unit is operable to indicate a current operational state of a communication link to a user, wherein the current operational state is selected from at least three possible operational states, the at least three operational states including an operable state, an inoperable state, and a transitional state.

10. The system of claim 9, wherein the at least one communication management unit is operable to communicate with at least one air traffic controller network, the air traffic controller network comprising at least one of a plurality of endpoints, and wherein the communication management unit is positioned in an aircraft.

11. The system of claim 10, wherein the at least one of the plurality of endpoints in the air traffic controller network comprises one of a workstation, a router, or a workstation and a router.

12. The system of claim 9, wherein the status indicator is a visual status indicator configured to visually display the current operational state of the communication link.

13. The system of claim 9, wherein the status indicator is an audio status indicator configured to announce the current operational state of the communication link when the operational state transitions from a previous operational state to the current operational state.

14. The system of claim 13, wherein the audio status indicator is further configured to periodically announce the current operational state of the communication link.

15. The system of claim 9, wherein the system is in a vehicle.

16. A non-transitory computer readable medium encoded with computer instructions stored thereon for a method of indicating a transitional operational state of a communication link, the method comprising:

indicating an operational state of the communication link is operable;

transmitting data between a communication management unit and an endpoint via the communication link;

determining if the transmitted data is received at the endpoint;

continuing to indicate the operational state of the communication link is operable when the transmitted data is received at the endpoint;

determining if a transport layer has timed out when the transmitted data is not received at the endpoint; and indicating the operational state of the communication link is transitional when the transport layer has not timed out and the transmitted data is not received at the endpoint.

17. The non-transitory computer readable medium of claim 16, further encoded with the computer instructions for the method further comprising:

powering up the communication management unit to establish communication from the communication management unit; and indicating the operational state of the communication link is inoperable during the power up.

18. The non-transitory computer readable medium of claim 17, further encoded with the computer instructions for the method further comprising:

establishing an end-to-end communication link based on the powering up of the communication management unit; and indicating the operational state of the communication link is operable when the end-to-end communication link is established.

19. The non-transitory computer readable medium of claim 18, further encoded with the computer instructions for the method further comprising:

indicating the operational state of the communication link is inoperable when the transport layer has timed out; and re-establishing the end-to-end communication link based on the transport layer timing out.

20. The non-transitory computer readable medium of claim 16, further encoded with the computer instructions for the method further comprising:

monitoring end-to-end communication between a first transport layer in the communication management unit and a second transport layer in at least one endpoint;

transmitting the data from a first data link layer in the communication management unit to a second data link layer in one of the at least one endpoints via the communication link; and timing out the first transport layer in the communication management unit if the transmitted data is not received at the second data link layer in one of the at least one endpoints before a transport time elapses.

* * * * *